(12) United States Patent
Kurihara

(10) Patent No.: US 11,755,053 B2
(45) Date of Patent: Sep. 12, 2023

(54) VEHICLE PEDAL INSTALLATION STRUCTURE

(71) Applicant: TOYOTA JIDOSHA KABUSHIKI KAISHA, Toyota (JP)

(72) Inventor: Koju Kurihara, Toyota (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 0 days.

(21) Appl. No.: 17/551,611

(22) Filed: Dec. 15, 2021

(65) Prior Publication Data
US 2022/0214709 A1    Jul. 7, 2022

(30) Foreign Application Priority Data
Jan. 7, 2021   (JP) ................................ 2021-001639

(51) Int. Cl.
| | |
|---|---|
| *G05G 1/30* | (2008.04) |
| *G05G 1/44* | (2008.04) |
| *B60K 26/02* | (2006.01) |
| *B60T 7/06* | (2006.01) |

(52) U.S. Cl.
CPC ............. *G05G 1/44* (2013.01); *B60K 26/02* (2013.01); *B60K 2026/026* (2013.01); *B60T 7/06* (2013.01)

(58) Field of Classification Search
CPC .. G05G 1/30; G05G 1/36; G05G 1/44; G05G 1/445; G05G 1/38; B60T 7/06; B60K 26/02; B60K 2026/026
See application file for complete search history.

(56) References Cited

U.S. PATENT DOCUMENTS

| | | | | |
|---|---|---|---|---|
| 1,500,354 | A | * 7/1924 | Williams | ............... B60K 26/02 74/482 |
| 2,710,547 | A | * 6/1955 | Alvanf | ..................... G05G 1/34 74/502.2 |
| 3,053,348 | A | * 9/1962 | Stair | ...................... B60T 13/58 188/138 |
| 3,477,310 | A | * 11/1969 | Garcia | ..................... G05G 1/34 74/562.5 |

(Continued)

FOREIGN PATENT DOCUMENTS

| | | | |
|---|---|---|---|
| CN | 203739655 U | * | 7/2014 |
| CN | 106627133 A | | 5/2017 |

(Continued)

OTHER PUBLICATIONS

Machine Translation of CN 203739655.*
Machine Translation of CN 107943199.*

*Primary Examiner* — Richard W Ridley
*Assistant Examiner* — Brian J McGovern
(74) *Attorney, Agent, or Firm* — Dinsmore & Shohl LLP

(57) ABSTRACT

A pedal installation structure for a vehicle, the pedal installation structure including: a pedal provided at a front portion of a vehicle cabin interior, the pedal having a pedal pad to which stepping force is applied and that is supported so as to be able to pivot around a shaft portion provided along a vehicle transverse direction; a harness connected to the pedal, the harness having, at a vehicle longitudinal direction front side of the pedal, a surplus length portion by which slack is obtained; and a guiding member that guides the harness such that the harness is routed at an outer side of the pedal pad, as seen in a plan view.

5 Claims, 6 Drawing Sheets

(56) References Cited

U.S. PATENT DOCUMENTS

| | | | | | |
|---|---|---|---|---|---|
| 3,543,606 | A | * | 12/1970 | Kaul | G05G 1/34 74/562.5 |
| 4,976,166 | A | * | 12/1990 | Davis | F02D 41/28 338/153 |
| 5,063,811 | A | * | 11/1991 | Smith | B60K 26/02 338/153 |
| 5,396,870 | A | * | 3/1995 | Beale | B60K 26/02 74/513 |
| 5,632,183 | A | * | 5/1997 | Rixon | B60T 13/586 74/512 |
| 5,693,927 | A | * | 12/1997 | Wilson | B60K 26/02 338/153 |
| 6,648,113 | B1 | * | 11/2003 | Bellfy | G05G 1/30 192/114 R |
| 11,543,848 | B2 | * | 1/2023 | Kihara | G05G 25/02 |
| 2003/0056615 | A1 | * | 3/2003 | Oberheide | G05G 1/405 74/512 |
| 2006/0201483 | A1 | * | 9/2006 | Herrick | F02D 11/02 123/399 |
| 2008/0223171 | A1 | * | 9/2008 | Fujiwara | G05G 1/38 74/512 |
| 2011/0068608 | A1 | | 3/2011 | Ohtsubo et al. | |
| 2011/0107870 | A1 | * | 5/2011 | Naruse | B60W 10/04 74/513 |
| 2011/0167951 | A1 | * | 7/2011 | Thiel | G05G 1/44 74/512 |
| 2015/0165986 | A1 | * | 6/2015 | Morris | B60R 21/20 248/505 |
| 2017/0191512 | A1 | * | 7/2017 | Geppert | F16L 55/035 |
| 2018/0148019 | A1 | * | 5/2018 | Graham | B60T 7/107 |
| 2018/0215261 | A1 | * | 8/2018 | Seegert | F16C 1/105 |

FOREIGN PATENT DOCUMENTS

| | | | | |
|---|---|---|---|---|
| CN | 107943199 B | * | 1/2020 | G05G 1/40 |
| JP | 2011-063197 A | | 3/2011 | |
| JP | 2011-201509 A | | 10/2011 | |

* cited by examiner

VEHICLE PEDAL INSTALLATION STRUCTURE

CROSS-REFERENCE TO RELATED APPLICATION

This application is based on and claims priority under 35 USC 119 from Japanese Patent Application No. 2021-001639 filed on Jan. 7, 2021, the disclosure of which is incorporated by reference herein.

BACKGROUND

Technical Field

The present disclosure relates to a pedal installation structure for a vehicle.

Related Art

Japanese Patent Application Laid-Open (JP-A) No. 2011-063197 discloses a technique relating to a so-called organ-type accelerator pedal that is set above a floor panel in a vehicle cabin interior and is provided so as to be able to pivot with the vehicle longitudinal direction rear end portion thereof being the fulcrum.

In JP-A No. 2011-063197, a control box is provided at the vehicle longitudinal direction front end portion and the vehicle vertical direction lower side of the accelerator pedal (hereinafter simply called "pedal"). A coupler is mounted to the front surface of the control box, and a harness is joined (hereinafter called "connected") to the coupler, and the harness is thereby connected to the control box.

Namely, in JP-A No. 2011-063197, the harness is connected to the coupler from the vehicle longitudinal direction front side of the control box that is provided at the vehicle longitudinal direction front end portion side of the pedal. Because the pedal is provided at the vehicle longitudinal direction front end portion of the vehicle cabin interior, the work involved in connecting the harness is difficult in a case in which the harness is connected from further toward the vehicle longitudinal direction front side than the pedal.

SUMMARY

The present disclosure provides a pedal installation structure for a vehicle that can improve the workability at the time of assembling a pedal to a floor panel side.

A first aspect of the present disclosure is a pedal installation structure for a vehicle the pedal installation structure including: a pedal provided at a front portion of a vehicle cabin interior, the pedal having a pedal pad to which stepping force is applied and that is supported so as to be able to pivot around a shaft portion provided along a vehicle transverse direction; a harness connected to the pedal, the harness having, at a vehicle longitudinal direction front side of the pedal, a surplus length portion by which slack is obtained; and a guiding member that guides the harness such that the harness is routed at an outer side of the pedal pad, as seen in a plan view.

The pedal installation structure for a vehicle of the first aspect of the present disclosure has the pedal, the harness and the guiding member. The pedal is provided at the front portion of the vehicle cabin interior. The pedal has the pedal pad to which stepping force is applied. The pedal pad is supported so as to be able to pivot around a shaft portion that is provided along the vehicle transverse direction. The harness is connected to the pedal, and has, at the vehicle longitudinal direction front side of the pedal, a surplus length portion by which slack is obtained. Further, the guiding member guides the harness such that the harness is routed at the outer side of the pedal pad as seen in a plan view.

For example, at the time when the pedal is assembled to the floor panel side, the pedal is fixed to the floor panel side in a state in which the harness is connected (joined) to the pedal. At this time, in a case in which the tension of the harness is high, there is little slack of the harness at the time of installing the pedal, and therefore, the position of the pedal is restricted, and the workability deteriorates by that much. Accordingly, the surplus length portion by which slack is obtained is provided at the harness in consideration of the workability at the time of installing the pedal.

On the other hand, as a comparative example, in a case in which the harness overlaps the inner side of the pedal pad as seen in a plan view, i.e., a case in which the harness overlaps the pedal pad as seen in a plan view, there is the possibility that the harness will enter-in beneath the pedal, and, in this case, there is also the possibility that the harness will break due to the pedal pad being depressed.

Accordingly, as described above, in a case in which a surplus length portion is provided at the harness, there is the possibility that the surplus length portion will enter-in beneath the pedal at the time of assembling the pedal to the floor panel side. Therefore, for example, at the time of assembling the pedal to the floor panel side, the surplus length portion must be avoided in order for it to not enter-in beneath the pedal, and, with regard to this point, the workability is poor.

In contrast, in the present disclosure, the harness that has the surplus length portion is guided by the guiding member so as to be routed at the outer side of the pedal pad as seen in a plan view. Due thereto, entering-in of the surplus length portion of the harness beneath the pedal is suppressed. Accordingly, in the present disclosure, at the time of assembling the pedal to the floor panel side, there is no need to avoid the surplus length portion in order for the surplus length portion to not enter-in beneath the pedal, and the workability may improve.

Note that "pedal" includes, other than the accelerator pedal, the brake pedal, the clutch pedal and the like. Further, "connect" includes mechanical connection in addition to electrical connection. Moreover, as described above, the "surplus length portion" is needed at the time of assembling the pedal to the floor panel side. Therefore, after the pedal is assembled to the floor panel side, there are cases in which the surplus length portion remains in a state in which there is slack thereat, and there are also cases in which the slack of the surplus length portion is eliminated by the routing of the harness.

In a second aspect of the present disclosure, in the first aspect, the guiding member may be set such that the surplus length portion is disposed at a vehicle longitudinal direction front side of the pedal pad.

In the pedal installation structure for a vehicle of the second aspect of the present disclosure, the surplus length portion of the harness is disposed at the vehicle longitudinal direction front side of the pedal pad by the guiding member. Due thereto, in the present disclosure, entering-in of the surplus length portion of the harness beneath the pedal may be suppressed.

In a third aspect of the present disclosure, in the first or second aspect, the guiding member may include: a clamp member that, at a front end portion of the vehicle cabin interior, is mounted to a bolt provided at a dash panel separating the vehicle cabin interior and a vehicle cabin exterior, and that holds the harness along the vehicle transverse direction; and a stopper member that abuts the clamp member and restricts rotation of the clamp member.

In the pedal installation structure for a vehicle of the third aspect of the present disclosure, the guiding member is structured to include a clamp member and a stopper member. The dash panel that separates the vehicle cabin interior and the vehicle cabin exterior is provided at the front end portion of the vehicle cabin interior, and a bolt is provided at the dash panel. The clamp member is mounted to the bolt, and the harness is held along the vehicle transverse direction by the clamp member.

Generally, the clamp member is structured so as to be mounted to a bolt, which is provided at the dash panel, along the axial direction of the bolt, and so as to be anchored on the male screw portion. Therefore, the clamp member can rotate with respect to the bolt.

Accordingly, the present disclosure further includes the stopper member as the guiding member. Due to the stopper member abutting the clamp member and restricting rotation of the clamp member, the state in which the harness is routed along the vehicle transverse direction is maintained. As a result, the harness may be guided so as to be routed at the pedal width direction outer side of the pedal pad as seen in a plan view.

In a fourth aspect of the present disclosure, in any one of the first through third aspects, the pedal may include a main body portion, the main body portion pivotably supporting the pedal pad and having a connector member to which the harness is connected; and the guiding member may include a retaining member that is provided at the connector member side of the harness and that retains a shape of the harness such that a bent portion, which changes a routing path at the surplus length portion, is at a pedal width direction outer side of the pedal pad and at a vehicle longitudinal direction front side of the pedal pad, as seen in a plan view.

In the pedal installation structure for a vehicle of the fourth aspect of the present disclosure, the pedal is structured so as to further include a main body portion that pivotably supports the pedal pad. The connector member to which the harness is connected is provided at the main body portion. Further, the maintaining member is included as the guiding member. The maintaining member is provided at the connector member side of the harness, and maintains the shape of the harness such that a bent portion, which changes the routing path at the surplus length portion, is at the pedal width direction outer side of the pedal pad and is at the vehicle longitudinal direction front side of the pedal pad as seen in a plan view. Due thereto, in the present disclosure, the harness may be guided so as to be routed at the pedal width direction outer side of the pedal pad as seen in a plan view.

As described above, the pedal installation structure for a vehicle of the first aspect of the present disclosure may improve the workability at the time when a pedal is assembled to a floor panel side.

The pedal installation structure for a vehicle of the second aspect of the present disclosure, due to the surplus length portion of the harness being disposed at the vehicle longitudinal direction front side of the pedal pad, entering-in of the surplus length portion beneath the pedal pad may be suppressed.

In the pedal installation structure for a vehicle of the third aspect of the present disclosure, the state in which the harness is routed along the vehicle transverse direction may be maintained by the clamp member and the stopper member.

In the pedal installation structure for a vehicle of the fourth aspect of the present disclosure, the shape of the harness may be maintained by the maintaining member, and the harness may be routed at the outer side of the pedal pad.

BRIEF DESCRIPTION OF THE DRAWINGS

Exemplary embodiments of the present disclosure will be described in detail based on the following figures, wherein.

DETAILED DESCRIPTION

A pedal, to which pedal installation structures for a vehicle relating to present embodiments are applied, is described hereinafter with reference to the drawings. Note that arrow FR that is illustrated appropriately in the following drawings indicates the front side in the vehicle longitudinal direction, and arrow UP indicates the upper side in the vehicle vertical direction. Further, arrow RH indicates the right side in the vehicle transverse direction. Hereinafter, when description is given by using merely longitudinal, vertical, and left-right directions, they refer to the longitudinal of the vehicle longitudinal direction, the vertical of the vehicle vertical direction, and the left and right of the vehicle left-right direction (the vehicle transverse direction), unless otherwise indicated.

<First Embodiment>

First, the structure of the pedal installation structure for a vehicle relating to a first embodiment is described.

Figure 1:
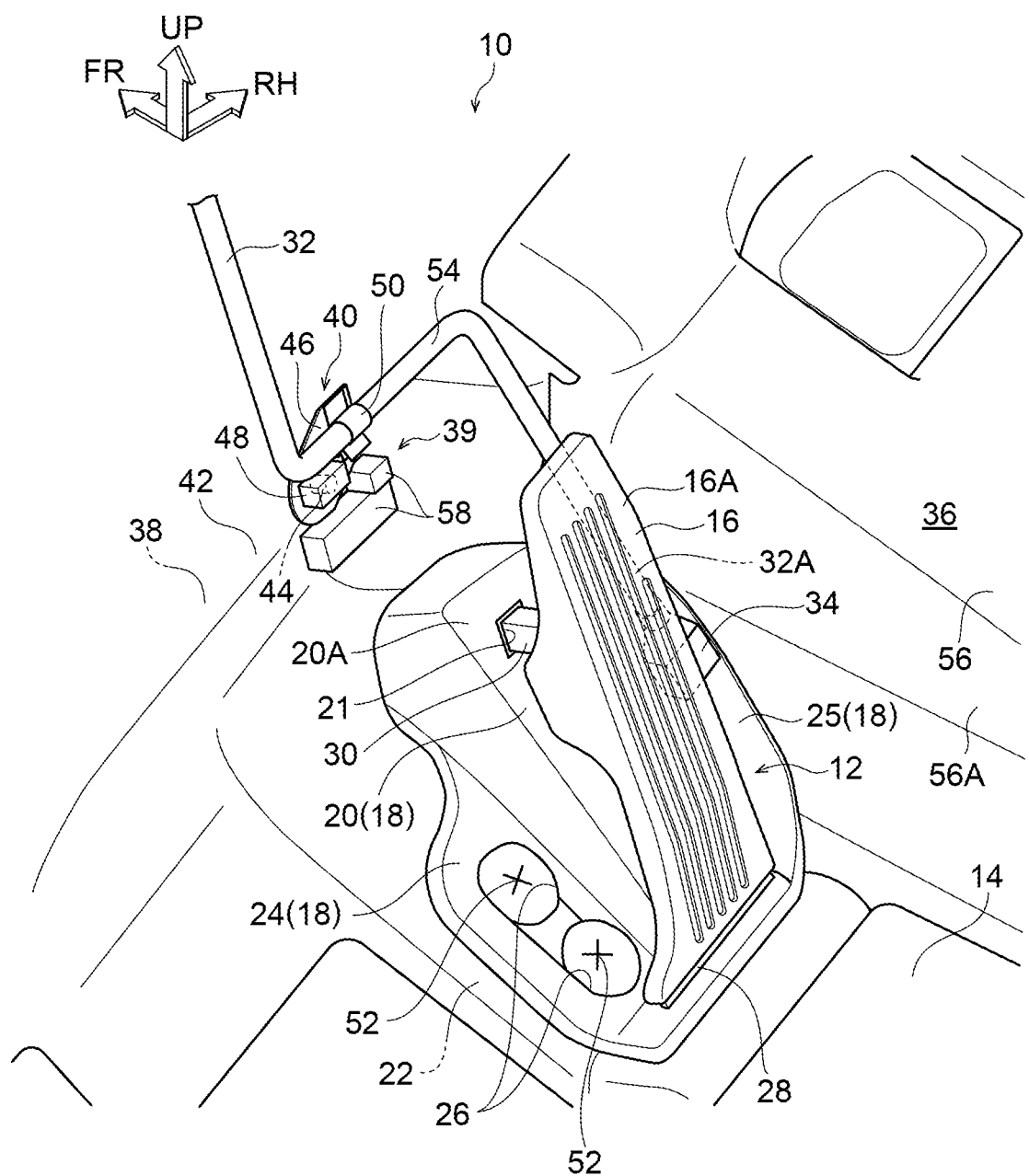
FIG. 1 is a perspective view illustrating main portions, which are seen from a vehicle transverse direction outer side and an obliquely upper side, of a state in which an organ-type pedal, to which a pedal installation structure for a vehicle relating to a first embodiment is applied, is mounted to a floor panel.

As illustrated in FIG. 1, an organ-type accelerator pedal (hereinafter called "organ-type pedal") 12, to which the pedal installation structure for a vehicle relating to the present embodiment is applied, is provided at the deep side of the lower portion of the portion of the instrument panel (not illustrated) that is at the driver's seat side that is provided at the left side of a vehicle 10. Namely, the vehicle 10 is a so-called left-hand drive vehicle. The vehicle 10 may, of course, be a right-hand drive vehicle.

The organ-type pedal 12 is provided at the upper side of a floor carpet 14, and is structured to include a pedal pad 16 that the driver depresses with his/her foot (including the sole when the driver is wearing shoes), and a base member (main body portion) 18 that pivotably supports the pedal pad 16.

The pedal pad 16 is formed of a metal such as, for example, an aluminum alloy, stainless steel or the like, and, as seen in a plan view, is formed in a substantially rectangular plate shape whose length direction is the vehicle longitudinal direction. At the pedal pad 16, an obverse surface 16A is formed in a recessed and protruded form. The pedal pad 16 is formed such that, in the state in which the pedal pad 16 is depressed, the position of the foot does not become offset from the obverse surface 16A of the pedal pad 16.

On the other hand, the base member 18 is structured by: a main body portion 20 that, as seen in a plan view, is disposed at the lower side of the pedal pad 16 and is shaped as a substantial rectangle whose length direction is the vehicle longitudinal direction; and a left flange portion 24 provided at the vehicle transverse direction left side and a right flange portion 25 provided at the right side, with respect to the main body portion 20.

The left flange portion 24 projects-out toward the vehicle transverse direction outer side from the lower portion of the main body portion 20, and is mounted to a floor panel 22 side. Fastening holes 26 are provided in the left flange portion 24, and the left flange portion 24 is fastened to the floor panel 22 (fastened portions 52) via bolts (not illustrated) that are inserted in the fastening holes 26. Due thereto, the base member 18 is fixed to the floor panel 22.

On the other hand, the right flange portion 25 projects-out from an upper wall portion 20A of the main body portion 20. A connector member 34 that is described later is disposed at the lower side of the right flange portion 25.

Figure 4:
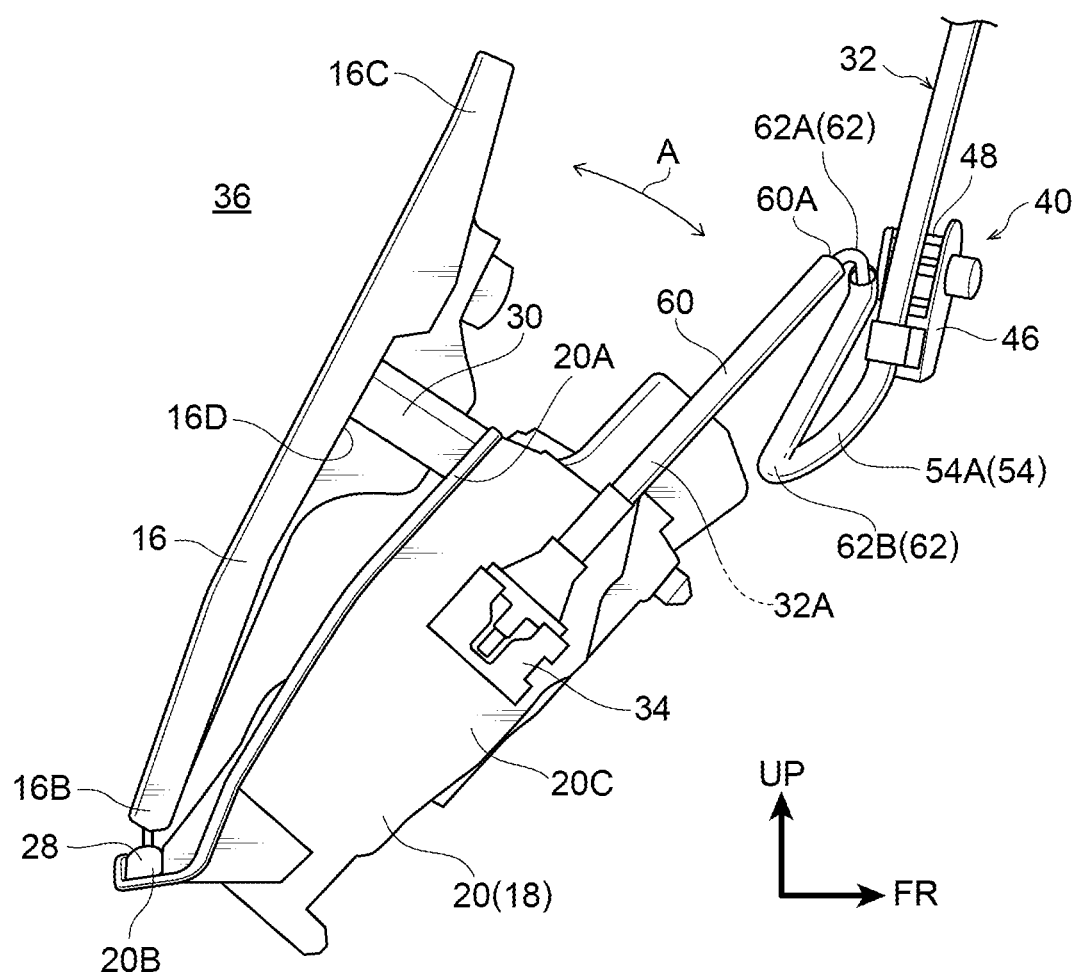
FIG. 4 is a schematic side view illustrating main portions of the organ-type pedal to which a pedal installation structure for a vehicle relating to a second embodiment is applied.

Here, FIG. 4 is a side view illustrating the organ-type pedal 12 to which a pedal installation structure for a vehicle relating to a second embodiment is applied. Although unrelated to the present embodiment, a hard tube 60 that is described later is provided. As illustrated in FIG. 4, a shaft portion 28 is provided along the vehicle transverse direction at a rear end portion 20B side of the main body portion 20.

This shaft portion 28 is rotatably (pivotably) supported with respect to the main body portion 20, and a rear end portion 16B of the pedal pad 16 is fixed to the shaft portion 28. Namely, the pedal pad 16 can pivot (the arrow A direction) with respect to the main body portion 20 around the shaft portion 28 including the rear end portion 16B of the pedal pad 16, with a front end portion 16C of the pedal pad 16 being the free end portion.

Further, a pushing member 30, which can be inserted through a hole portion 21 (see FIG. 1), which is formed in the upper wall portion 20A of the main body portion 20 for example, is provided at a reverse surface 16D side of the pedal pad 16. Although not illustrated, a spring member is provided within the main body portion 20, and the distal end portion of the pushing member 30 abuts the spring member.

Therefore, when the pedal pad 16 is pushed (is stepped upon by the foot), the spring member is compressively deformed by the pushing member 30, and elastic energy accumulates thereat. Then, when the pushing force on the pedal pad 16 is released (when the foot is removed therefrom), the spring member is restored, and the pedal pad 16 returns to its original position (initial state).

Note that, although not illustrated, an anchor portion is provided at the pushing member 30, and an unillustrated anchored-on portion, which the anchor portion anchors on, is formed at the main body portion 20. Due to the anchor portion anchoring on the anchored-on portion, at the time when the spring member is restored, the pushing member 30 is prevented from coming out of the main body portion 20. Namely, in the state in which the pedal pad 16 is not being depressed, the pedal pad 16 is maintained at a predetermined angle as the initial state thereof.

Further, although the present embodiment describes a structure in which the pushing member 30 is provided at the reverse surface 16D side of the pedal pad 16, it suffices for elastic energy to accumulate at the spring member due to the pedal pad 16 being pushed. Therefore, the pushing member 30 may be provided at the main body portion 20 side. In this case, due to the pushing of the pedal pad 16, the pushing member 30 moves in the direction of compressively deforming the spring member.

Here, when the pedal pad 16 pivots, the shaft portion 28 to which the pedal pad 16 is fixed pivots integrally with the pedal pad 16. At this time, although not illustrated, a sensor portion senses the amount of pivoting of the shaft portion 28, and transmits an electric signal to an engine control unit via a wire harness 32. Due to this electric signal, the degree of opening of the throttle valve of the engine is adjusted in accordance with the amount of pivoting of the shaft portion 28. Of course, the degree of opening of the throttle valve may be adjusted mechanically via the wire harness 32.

Figure 2:
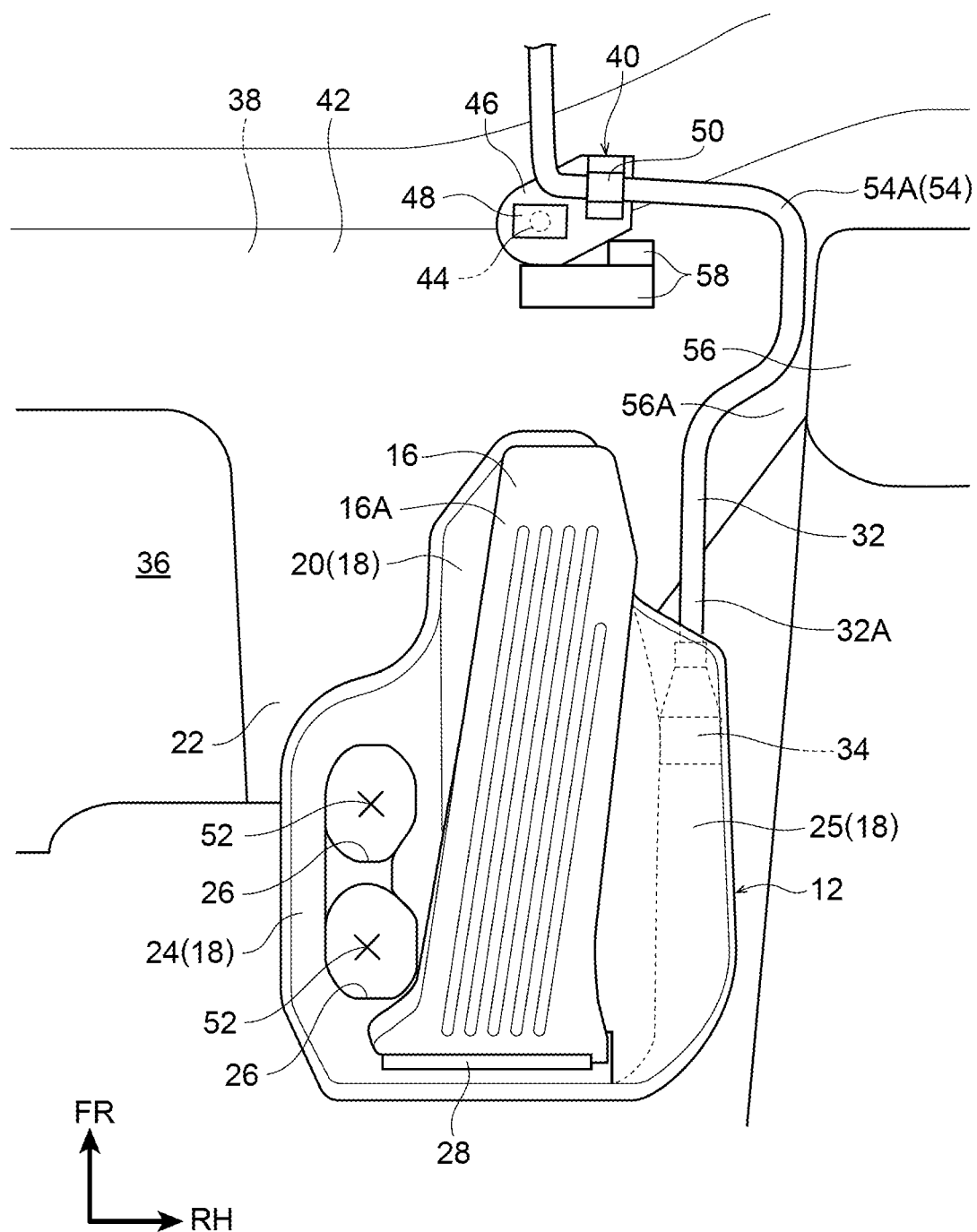
FIG. 2 is a schematic plan view illustrating main portions in the state in which the organ-type pedal, to which the pedal installation structure for a vehicle relating to a first embodiment is applied, is mounted to the floor panel.

On the other hand, as illustrated in FIG. 1 and FIG. 2, the connector member 34 that is connected to the unillustrated sensor portion is provided at a right side wall portion 20C (hereinafter called tunnel portion 56 side) of the main body portion 20 that structures a portion of the base member 18 of the organ-type pedal 12. One end portion 32A of the wire harness 32 is connected to the connector member 34, and the other end portion of the wire harness 32 is connected to the engine control unit side, although not illustrated.

The engine control unit is, for example, disposed within the power unit chamber that is provided at the vehicle front portion. The power unit chamber and a vehicle cabin interior 36 are separated by a dash panel 38. Therefore, a clamp member 40 for grasping (holding) the wire harness 32 is mounted to the dash panel 38 as a portion of a guiding member 39, and the wire harness 32 is grasped by this clamp member 40.

Accordingly, the wire harness 32, which is connected to the connector member 34 provided at the base member 18 of the organ-type pedal 12 that is disposed at the vehicle cabin interior 36 side, extends-out from the organ-type pedal 12 toward the vehicle front side, and is routed along the revers surface side of the dash panel 38. Note that a silencer 42, which is made of a non-woven fabric and has a sound-absorbing effect as a sound-insulating member, is laid at the vehicle cabin interior 36 side of the dash panel 38. Therefore, strictly speaking, the wire harness 32 is routed along the obverse surface of the silencer 42.

Here, a weld bolt 44 is provided at the dash panel 38, and the clamp member 40 is mounted to the weld bolt 44. The clamp member 40 is structured to include a base portion 46 that is plate-shaped and abuts the silencer 42, a mounted portion 48 that is provided integrally with the base portion 46 and is mounted to the weld bolt 44, and a grasping portion 50 that is provided integrally with the base portion 46 and grasps (holds) the wire harness 32.

For example, an insert-through hole, through which the male screw portion of the weld bolt 44 can be inserted, is formed in the mounted portion 48, and plural claw portions project-out from the inner edge of the insert-through hole toward the center of the insert-through hole. The claw portions can anchor on the male screw portion that is formed at the weld bolt 44. When the weld bolt 44 is inserted into the insert-through hole of the mounted portion 48, the plural claw portions anchor on the male screw portion of the weld bolt 44, and, due thereto, the mounted portion 48 is mounted to the weld bolt 44. On the other hand, because the grasping portion 50 grasps the wire harness 32, the wire harness 32 can be routed along the obverse surface side of the dash panel 38 via the clamp member 40.

By the way, at the time of installing the organ-type pedal 12, first, the one end portion 32A of the wire harness 32 is connected to the connector member 34 of the organ-type pedal 12. Next, the base member 18 of the organ-type pedal 12 is fastened to the floor panel 22 side. At the time of installing the organ-type pedal 12, the worker sticks only the upper half of his/her body into the vehicle cabin interior 36 side from the vehicle outer side, and carries out the above-described series of operations.

At this time, for example, in a case in which the tension of the wire harness 32 is high, there is little slack (play) at the time of installing the organ-type pedal 12, and therefore, the position of the organ-type pedal 12 is restricted, and the workability deteriorates by that much. Thus, in the present embodiment, a surplus length portion 54 by which a slack portion 54A is obtained is provided at the wire harness 32 in order to facilitate installation for the worker.

On the other hand, at the dash panel 38, the weld bolt 44 is provided at the front side and the upper side of the organ-type pedal 12 in the present embodiment, as a region at which a flat seat surface for mounting the clamp member 40 is obtained. The mounted portion 48 of the clamp member 40 is mounted to this weld bolt 44. Namely, the surplus length portion 54 is provided between the clamp member 40 and the connector member 34.

Here, the tunnel portion 56 is provided at the vehicle transverse direction central portion of the floor panel 22 so as to project-out toward the upper side. The connector member 34, to which the one end portion 32A of the wire harness 32 is connected, is provided at the tunnel portion 56 side of the organ-type pedal 12. Therefore, the wire harness 32, which is grasped by the grasping portion 50 of the clamp member 40, is guided toward a side wall portion 56A side of the tunnel portion 56.

Namely, the orientation of the clamp member 40 is set such that the wire harness 32 is routed along the vehicle transverse direction by the grasping portion 50. Then, when the wire harness 32 reaches the side wall portion 56A of the tunnel portion 56, the wire harness 32 is routed along the vehicle longitudinal direction. In this way, by routing the wire harness 32 so as not to pass the lower side of the pedal pad 16, the amount of slack of the slack portion 54A that is formed at the front side of the organ-type pedal 12 can be reduced.

Figure 3A:
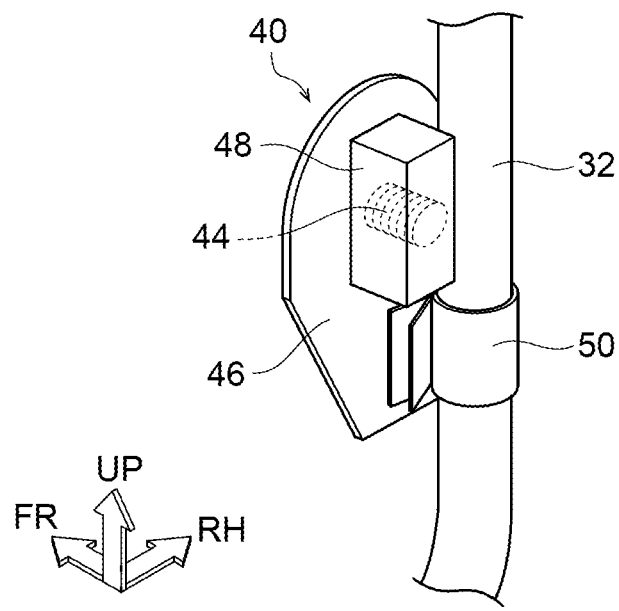
FIG. 3A is a perspective view illustrating, as a comparative example, a state in which a wire harness is held by a clamp member.
Figure 3B:
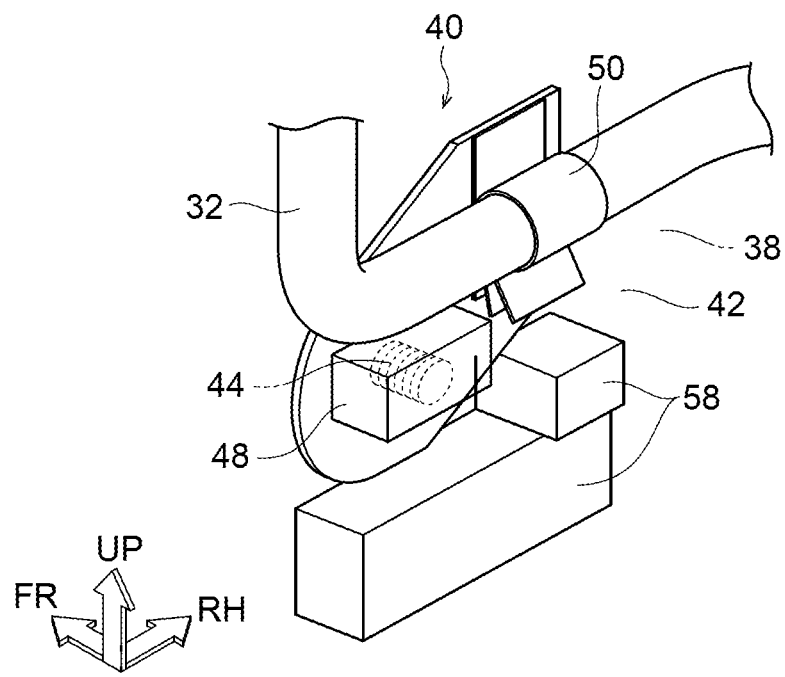
FIG. 3B is a perspective view illustrating a state in which the wire harness of the organ-type pedal, to which the pedal installation structure for a vehicle relating to a first embodiment is applied, is held by the clamp member.

As described above, the orientation of the clamp member 40 is set such that the wire harness 32 is routed along the vehicle transverse direction by the grasping portion 50. As illustrated in FIG. 3B, in the present embodiment, silencers (stopper members) 58 that serve as a guiding member are further provided as another portion of the guiding member 39, so as to abut the clamp member 40 at the lower side of the clamp member 40 whose orientation is set such that the wire harness 32 is routed along the vehicle transverse direction by the grasping portion 50.

Namely, at the lower side of the clamp member 40, the plate thickness of the silencer 42 is made to be thick, and the silencers 58 are formed. The silencers 58 are made to abut the clamp member 40. Of course, a silencer may be provided separately from the silencer 42.

Operation of the pedal installation structure for a vehicle relating to the present embodiment are described next.

As illustrated in FIG. 1 and FIG. 2, in the present embodiment, the wire harness 32 is connected to the organ-type pedal 12, and the surplus length portion 54 that has the slack portion 54A is provided at the front side of the organ-type pedal 12. On the other hand, the guiding member 39 guides the wire harness 32 such that, as seen in a plan view, the wire harness 32 is routed at the outer side in the pedal width direction of the organ-type pedal 12.

As described above, at the time of assembling the organ-type pedal 12 to the floor panel 22 side, the organ-type pedal 12 is fixed to the floor panel 22 side in the state in which the wire harness 32 is connected to the organ-type pedal 12. Therefore, in the present embodiment, the surplus length portion 54 by which the slack portion 54A is obtained is provided at the wire harness 32 in consideration of the workability at the time of installing the organ-type pedal 12.

In this way, in the present embodiment, by providing the surplus length portion 54, the organ-type pedal 12 to which the wire harness 32 is connected can be assembled to the floor panel 22 side upon ensuring slack of the wire harness 32 at the time of installing the organ-type pedal 12. Therefore, an improvement in workability at the time of installing the organ-type pedal 12 may be devised.

Figure 6:
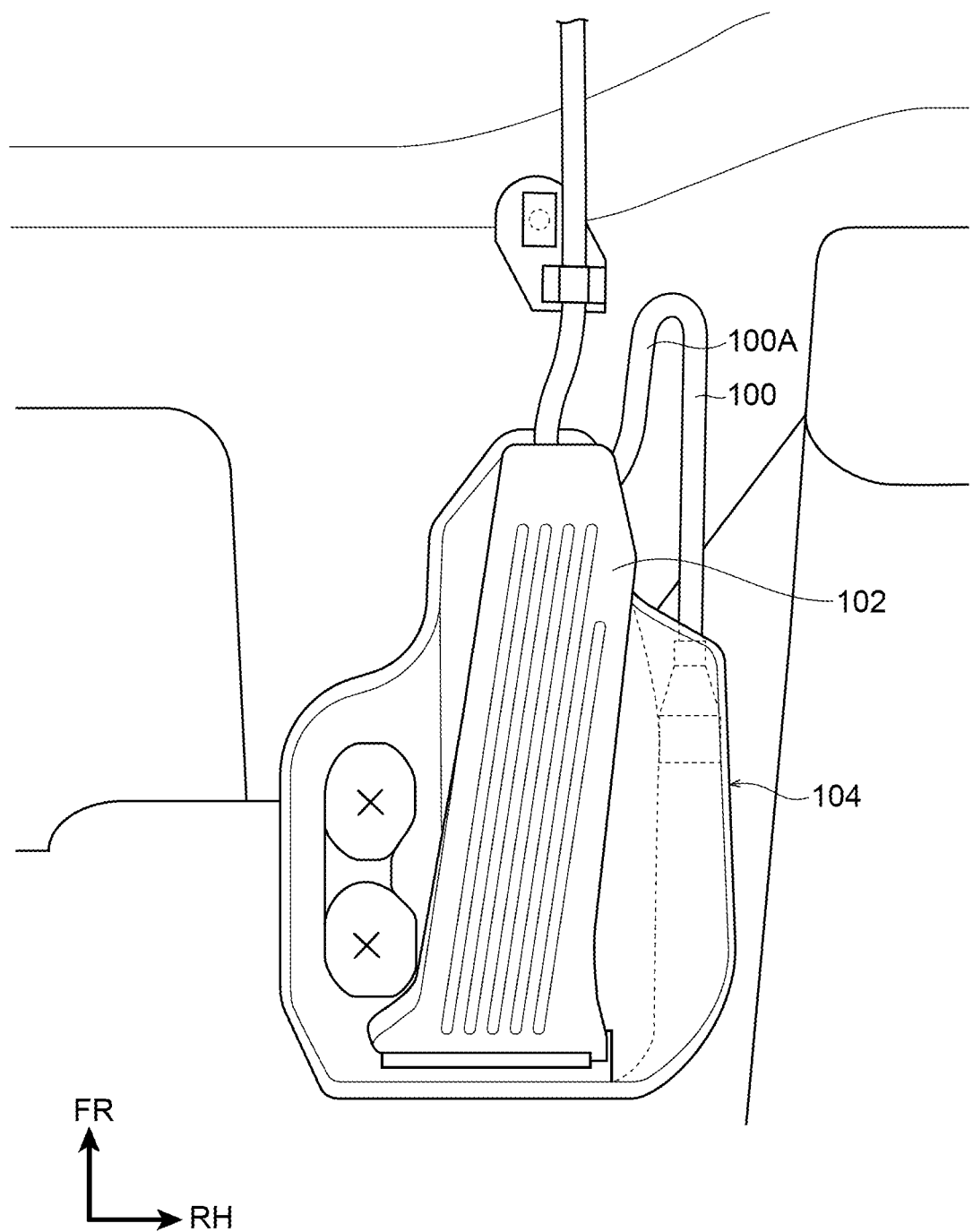
FIG. 6 is a schematic plan view that corresponds to FIG. 2 and illustrates a comparative example.

On the other hand, as a comparative example, as illustrated in FIG. 6, in a case in which a surplus length portion 100A of a wire harness 100 is at the inner side in the pedal width direction of a pedal pad 102 as seen in a plan view, i.e., in a case in which the wire harness 100 overlaps the pedal pad 102 as seen in a plan view, there is the possibility that the wire harness 100 will enter-in beneath an organ-type pedal 104. In this case, there is also the possibility that the wire harness 100 will break due to the pedal pad 102 being depressed.

In contrast, in the present embodiment, as illustrated in FIG. 2, the wire harness 32 is routed along the vehicle transverse direction by the guiding member 39 that includes the clamp member 40 and the silencers 58. Due thereto, in the present embodiment, the wire harness 32 is routed at the outer side of the pedal pad 16 as seen in a plan view.

As a result, in the present embodiment, it can be made such that the wire harness 32 does not enter-in beneath the organ-type pedal 12. Accordingly, in the present embodiment, breakage of the wire harness 32 that arises due to the pedal pad 16 being depressed may be prevented.

Further, in the present embodiment, because entering-in of the wire harness 32 beneath the organ-type pedal 12 is suppressed, at the time when the organ-type pedal 12 is assembled to the floor panel 22 side, there is no need to avoid the wire harness 32 in order for the wire harness 32 to not enter-in beneath the organ-type pedal 12, and the workability improves.

Further, in the present embodiment, the wire harness 32 is routed along the vehicle transverse direction by the clamp member 40, and, when the wire harness 32 reaches the side wall portion 56A of the tunnel portion 56 of the floor panel 22, the wire harness 32 is routed along the vehicle longitudinal direction. Because the connector member 34, to which the one end portion 32A of the wire harness 32 is connected, is provided at the right side wall portion 20C of the main body portion 20 of the organ-type pedal 12, the wire harness 32 can be routed in the vehicle longitudinal direction along the side wall portion 56A of the tunnel portion 56.

Namely, in the present embodiment, the wire harness 32 can be guided so as to be routed at the outer side of the pedal pad 16 as seen in a plan view. In this way, by routing the wire harness 32 so as not to pass the lower side of the pedal pad 16, the amount of slack of the slack portion 54A that is formed at the front side of the organ-type pedal 12 can be reduced.

By the way, in the present embodiment, the silencers 58 are provided at the lower side of the clamp member 40, and abut the clamp member 40. At the mounted portion 48 of the clamp member 40, the claw portions anchor on the male screw portion of the weld bolt 44. Therefore, when external force (e.g., self-weight), which exceeds the frictional force arising between the male screw portion of the weld bolt 44 and the claw portions, acts on the clamp member 40, as illustrated in FIG. 3A, the clamp member 40 rotates with respect to the weld bolt 44.

Therefore, in the present embodiment, as illustrated in FIG. 3B, by providing the silencers 58 in the direction in which the self-weight due to the wire harness 32 is applied, and causing the silencers 58 to abut the clamp member 40, rotation of the clamp member 40 is restricted. Namely, in the present embodiment, the state in which the wire harness 32 is routed along the vehicle transverse direction may be maintained.

In this way, in the present embodiment, rotation of the clamp member 40 is restricted by using the silencers 58 (the silencer 42). Because the silencer 42 is laid at the dash panel 38, by utilizing the silencer 42, there is no need to separately provide a member for restricting rotation of the clamp member 40. However, because it suffices to be able to restrict rotation of the clamp member 40 by abutting the clamp member 40, another member other than the silencers 58 may, of course, be used.

<Second Embodiment>

The structure of a pedal installation structure for a vehicle relating to a second embodiment is described next. The basic structure of the pedal installation structure for a vehicle in the present embodiment is substantially the same as the structure of the pedal installation structure for a vehicle of the first embodiment. Therefore, in the present embodiment, contents which differ from the first embodiment are described.

In the present embodiment, as illustrated in FIG. 4, the hard tube (holding member) 60 is placed on the exterior of the one end portion 32A (the connector member 34) side of the wire harness 32. Due thereto, the wire harness 32 can be routed along the shape of the hard tube 60.

The one end portion 32A side of the wire harness 32 is, together with the hard tube 60, routed along the vehicle longitudinal direction in the state in which the hard tube 60 is placed on the exterior of the one end portion 32A. The length of the hard tube 60 is set such that, as seen in a plan view, a distal end 60A of the hard tube 60 does not project-out from the distal end of the pedal pad 16. On the other hand, at the surplus length portion 54 of the wire harness 32, a routing path 62 along which the wire harness 32 is routed is changed by bent portions 62A, 62B.

Here, the bent portion 62A is provided in a vicinity of the distal end 60A of the hard tube 60, and, after the routing path 62 heads toward the vehicle rear side due to the bent portion 62A, the routing path 62 heads toward the vehicle front side (the clamp member 40 side) due to the bent portion 62B. Moreover, the bent portions 62A, 62B are respectively set so as to be at the front side of the organ-type pedal 12. Due thereto, in the present embodiment, the shape of the wire harness 32 can be maintained such that the wire harness 32 is at the front side of the organ-type pedal 12 as seen in a plan view.

By respectively setting the bent portions 62A, 62B of the routing path 62 so as to be at the front side of the organ-type pedal 12 by the hard tube 60 in this way, in the present embodiment, the surplus length portion 54 of the wire harness 32 is disposed at the front side of the organ-type pedal 12. Due thereto, in the present embodiment, it can be made such that the surplus length portion 54 of the wire harness 32 does not enter-in beneath the organ-type pedal 12.

Note that, although the hard tube 60 is used in the present embodiment, because it suffices to be able to route the wire harness 32 along the vehicle longitudinal direction, the present disclosure is not limited to the hard tube 60. Effects that are similar to those of the hard tube 60 may be obtained provided that there is provided a member that can hold the wire harness 32 such as, for example, a connector cover 34A, a wound tape portion 64 at which a tape such as a vinyl tape or the like is wound, or the like. Further, the present embodiment can be applied together with the first embodiment.

Further, in the present embodiment, the hard tube 60 is placed on the exterior of the one end portion 32A side of the wire harness 32. However, it suffices for the distal end 60A of the hard tube 60 to project-out from the distal end of the pedal pad 16 as seen in a plan view. Therefore, depending on the place at which the connector member 34 is disposed, it is not absolutely necessary to place the hard tube 60 at the exterior of the one end portion 32A side of the wire harness 32.

Figure 5:
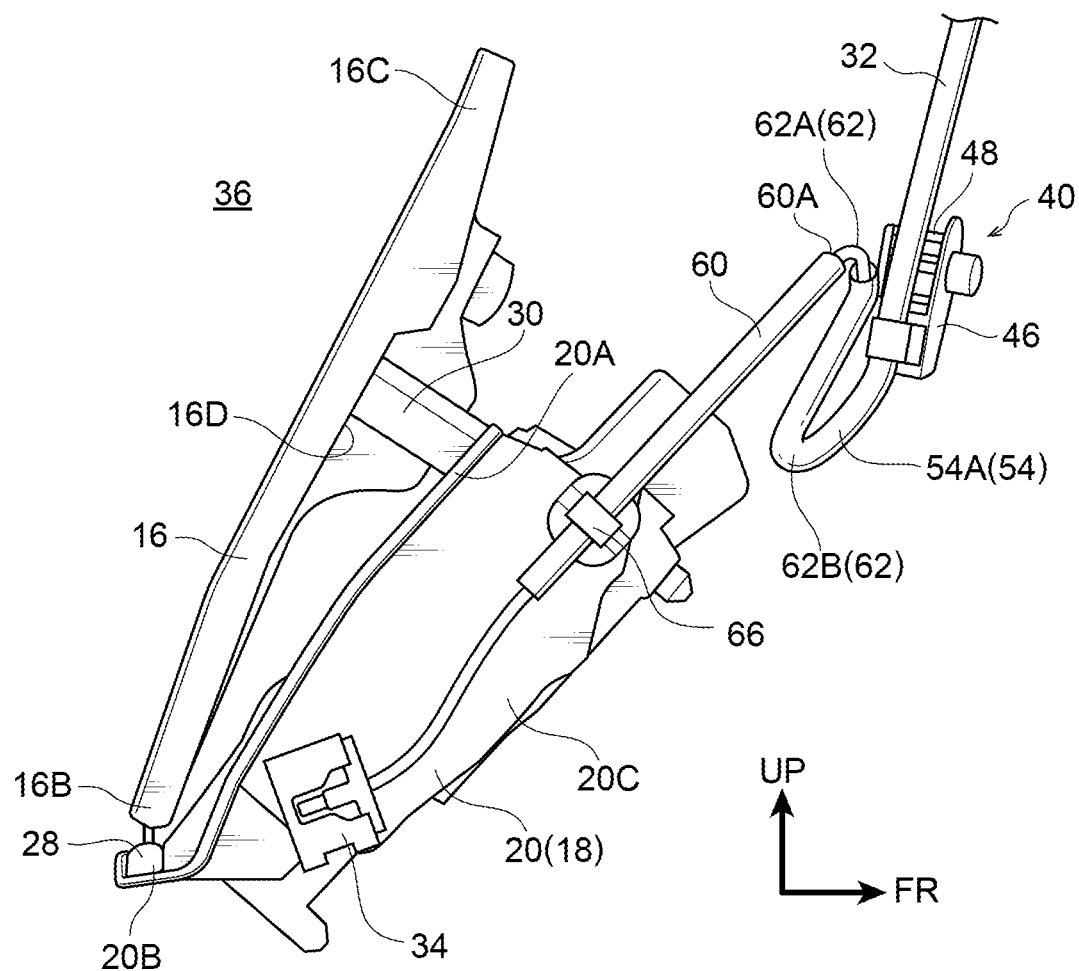
FIG. 5 is a schematic side view that corresponds to FIG. 4 and illustrates a modified example of the organ-type pedal to which the pedal installation structure for a vehicle relating to the second embodiment is applied.

For example, as illustrated in FIG. 5 as a modified example of the present embodiment, in a case in which the connector member 34 is provided at the vehicle longitudinal direction rear portion side of the organ-type pedal 12, if the length of the hard tube 60 is set such that the distal end 60A thereof projects-out from the distal end of the pedal pad 16 as seen in a plan view, the length of the hard tube 60 becomes long.

Therefore, the hard tube 60 is fixed by providing a holder 66 at the right side wall portion 20C of the main body portion 20 of the organ-type pedal 12, and holding the hard tube 60 by this holder 66. In this case, the one end portion 32A side of the wire harness 32 may be exposed. Due thereto, the hard tube 60 can be set to the minimum length needed.

Further, the pedal pad 16, which relates to a vehicle floor structure having the organ-type pedal relating to the present embodiment, is described as the pedal pad 16 of the organ-type pedal 12. However, the present disclosure is not limited to this, and may be applied to the pedal pad of an organ-type brake pedal or the like.

Moreover, in the present embodiment, the organ-type pedal 12 is structured to include the pedal pad 16 and the base member 18 that supports the pedal pad 16 pivotably. However, because it suffices for the pedal pad 16 to be pivotably supported, the base member 18 is not absolutely necessary.

The vehicle floor structure that has the organ-type pedal relating to the present embodiment is not limited to a vehicle that runs by the driving force of an engine, and may be applied to an electric vehicle at which the vehicle runs by the driving force of a motor.

Although embodiments of the present disclosure have been described above, the present disclosure is not limited to the above, and, of course, can be implemented by being modified in various ways other than the above within a scope that does not depart from the gist thereof.

What is claimed is:

1. A pedal installation structure for a vehicle, the pedal installation structure comprising:
   a pedal provided at a front portion of a vehicle cabin interior, the pedal having a base member and a pedal pad to which stepping force is applied and that is supported so as to be able to pivot around a shaft portion provided along a vehicle transverse direction, the base member including a flange portion;
   a harness connected to the pedal at a connector member disposed at a lower side of the flange portion, the harness having, at a vehicle longitudinal direction front side of the pedal, a surplus length portion by which slack is obtained; and
   a guiding member that guides the harness such that the harness is routed at an outer side of the pedal pad, as seen in a plan view, the guiding member including:
      a clamp member that, at a front end portion of the vehicle cabin interior, is mounted to a bolt provided at a dash panel separating the vehicle cabin interior and a vehicle cabin exterior, and that holds the harness along the vehicle transverse direction; and
      a stopper member that abuts the clamp member and restricts rotation of the clamp member.

2. The pedal installation structure for a vehicle of claim 1, wherein the guiding member is set such that the surplus length portion is disposed at a vehicle longitudinal direction front side of the pedal pad.

3. The pedal installation structure for a vehicle of claim 1, wherein:
   the base member pivotably supports the pedal pad and has the connector member to which the harness is connected; and
   the guiding member includes a retaining member that is provided at the connector member side of the harness and that retains a shape of the harness such that a bent portion, which changes a routing path at the surplus length portion, is at a pedal width direction outer side of the pedal pad and at a vehicle longitudinal direction front side of the pedal pad, as seen in a plan view.

4. The pedal installation structure for a vehicle of claim 1, wherein the harness extends from the pedal toward a vehicle front side, and is routed along an obverse surface side of the dash panel.

5. The pedal installation structure for a vehicle of claim 1, wherein the surplus length portion of the harness is routed along the vehicle transverse direction by the guiding member.

* * * * *